US012561845B2

(12) United States Patent
Lim et al.

(10) Patent No.: US 12,561,845 B2
(45) Date of Patent: Feb. 24, 2026

(54) DISTORTION INFORMATION FOR EACH ITERATION OF VERTICES RECONSTRUCTION

(71) Applicant: Samsung Electronics Co., Ltd., Suwon-si (KR)

(72) Inventors: Youngkwon Lim, McKinney, TX (US); Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 18/627,336

(22) Filed: Apr. 4, 2024

(65) Prior Publication Data

US 2024/0355001 A1 Oct. 24, 2024

Related U.S. Application Data

(60) Provisional application No. 63/542,910, filed on Oct. 6, 2023, provisional application No. 63/460,352, filed
(Continued)

(51) Int. Cl.
*G06T 9/00* (2006.01)
*G06T 17/20* (2006.01)
*H04N 19/184* (2014.01)

(52) U.S. Cl.
CPC .............. *G06T 9/001* (2013.01); *G06T 17/20* (2013.01); *G06T 17/205* (2013.01); *H04N 19/184* (2014.11)

(58) Field of Classification Search
CPC ....... G06T 9/001; G06T 17/20; G06T 17/205; G06T 15/04; G06T 9/004; G06T 2200/04;
(Continued)

(56) References Cited

U.S. PATENT DOCUMENTS

2021/0287431 A1 9/2021 Woop et al.
2022/0028119 A1 1/2022 Rhyu et al.
(Continued)

FOREIGN PATENT DOCUMENTS

KR        10-2313555 B1    10/2021
KR   10-2022-0028010 A      3/2022
(Continued)

OTHER PUBLICATIONS

International Search Report and Written Opinion issued Jul. 18, 2024 regarding International Application No. PCT/KR2024/005167, 8 pages.
(Continued)

*Primary Examiner* — Xiao M Wu
*Assistant Examiner* — Scott E Sonners

(57) ABSTRACT

An apparatus includes a communication interface configured to receive a compressed bitstream including a base mesh sub-bitstream and a processor operably coupled to the communication interface. The processor is configured to decode a plurality of submeshes from the base mesh sub-bitstream. The processor is also configured to subdivide a submesh of the plurality of submeshes according to a subdivision iteration count to generate at least one subdivided submesh, including determine a number of vertex positions for the at least one subdivided submesh by use of a number of vertices associated with an original submesh and by use of distortion information between the original submesh and a base mesh at each subdivision iteration associated with the subdivision iteration count. The processor is also configured to reconstruct at least a portion of a mesh-frame using the vertex positions corresponding to the at least one subdivided submesh.

20 Claims, 13 Drawing Sheets

Related U.S. Application Data on Apr. 19, 2023, provisional application No. 63/460,220, filed on Apr. 18, 2023.

(58) Field of Classification Search
CPC  G06T 9/00; G06T 15/005; G06T 7/10; G06T 7/13; G06T 9/20; G06T 1/20; G06T 15/00; G06T 2200/28; H04N 19/597; H04N 19/70; H04N 19/184; H04N 19/119; H04N 19/124; H04N 19/136; H04N 19/44; H04N 19/54; H04N 19/159; H04N 19/61; H04N 19/169; H04N 19/46; H04N 19/52; H04N 19/463
See application file for complete search history.

(56)  References Cited

U.S. PATENT DOCUMENTS

| | | | |
|---|---|---|---|
| 2023/0014820 A1 | 1/2023 | Zhang et al. | |
| 2023/0063575 A1 | 3/2023 | Huang et al. | |
| 2023/0090677 A1* | 3/2023 | Zhang | G06T 9/001 |
| | | | 382/100 |
| 2023/0290063 A1* | 9/2023 | Mammou | G06T 17/20 |
| 2023/0401755 A1* | 12/2023 | Mammou | G06T 9/001 |
| 2024/0022765 A1* | 1/2024 | Tourapis | H04N 19/159 |
| 2024/0153150 A1* | 5/2024 | Kim | H04N 19/597 |
| 2024/0233192 A1* | 7/2024 | Cao | G06T 9/001 |
| 2024/0348825 A1* | 10/2024 | Van der Auwera | H04N 19/60 |

FOREIGN PATENT DOCUMENTS

| | | |
|---|---|---|
| WO | 0022577 A1 | 4/2000 |
| WO | 2024217304 A1 | 10/2024 |

OTHER PUBLICATIONS

"V-Mesh Test Model v1," WG 7, MPEG 3D Graphics and Haptics Coding, ISO/IEC JTC 1/SC 29/WG 7 N00404, Jul. 2022, 15 pages.

"V-DMC Test Model v2 (TMM v2)," MPEG Coding for 3D Graphics and Haptics, ISO/IEC JTC 1/SC 29/WG 7 N00456, Oct. 2022, 25 pages.

"WD 1.0 of V-DMC," MPEG 3D Graphics and Haptics Coding, ISO/IEC JTC 1/SC 29/WG 07 N0486, Dec. 2023, 68 pages.

"WD 2.0 of V-DMC," MPEG 3D Graphics and Haptics Coding, ISO/IEC JTC 1/SC 29/WG 7 N00546, Feb. 2023, 76 pages.

"WD 3.0 of V-DMC," MPEG 3D Graphics and Haptics Coding, ISO/IEC JTC 1/SC 29/WG 07 N00611, May 2023, 142 pages.

"WD 4.0 of V-DMC," MPEG 3D Graphics and Haptics Coding, ISO/IEC JTC 1/SC 29/WG 07 N00611, Aug. 2023, 145 pages.

"WD 5.0 of V-DMC," MPEG 3D Graphics and Haptics Coding, ISO/IEC JTC 1/SC 29/WG 7 N00744, Aug. 2023, 158 pages.

"WD of V-DMC," MPEG 3D Graphics and Haptics Coding, ISO/IEC JTC 1/SC 29/WG 7 N00822, Aug. 2023, 190 pages.

"V-DMC Test Model v3 (TMM v3)," MPEG 3D Graphics and Haptics Coding, ISO/IEC JTC 1/SC 29/WG 7 N00530, Jan. 2023, 26 pages.

* cited by examiner

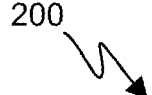
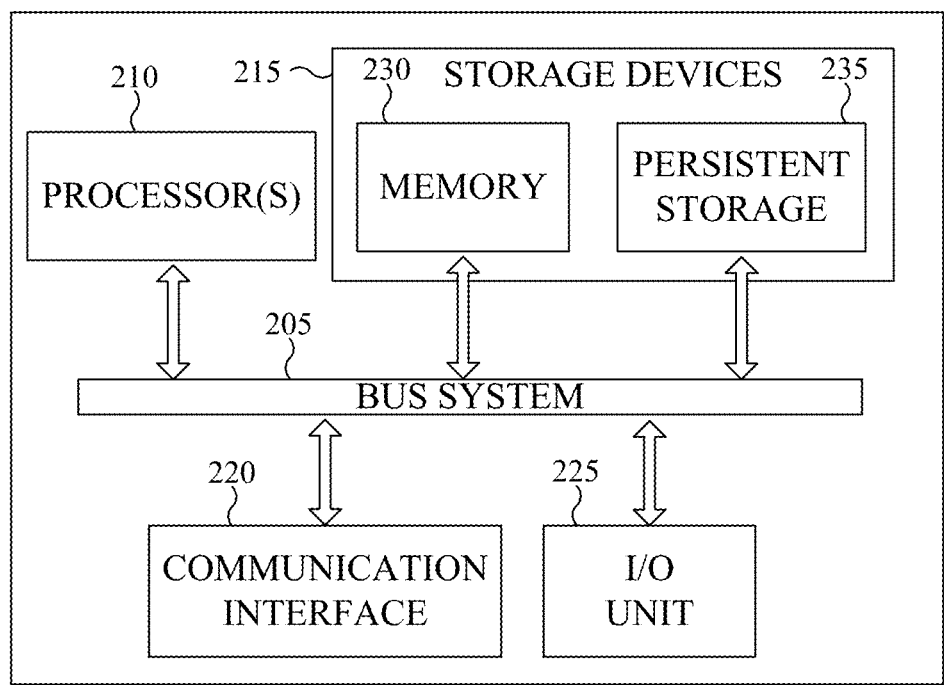
FIGURE 2

300

330           325           310

305

| SPEAKER(S) | ← | RX PROCESSING CIRCUITRY | ← | RF TRANSCEIVER |

320           315

| MICROPHONE | → | TX PROCESSING CIRCUITRY |

340           350

| I/O IF | ↔ | PROCESSOR(S) | ← | INPUT |

345

| SENSOR(S) | → | | → | DISPLAY |

365           355

360

MEMORY

OPERATING SYSTEM (OS) ~361

APPLICATIONS ~362

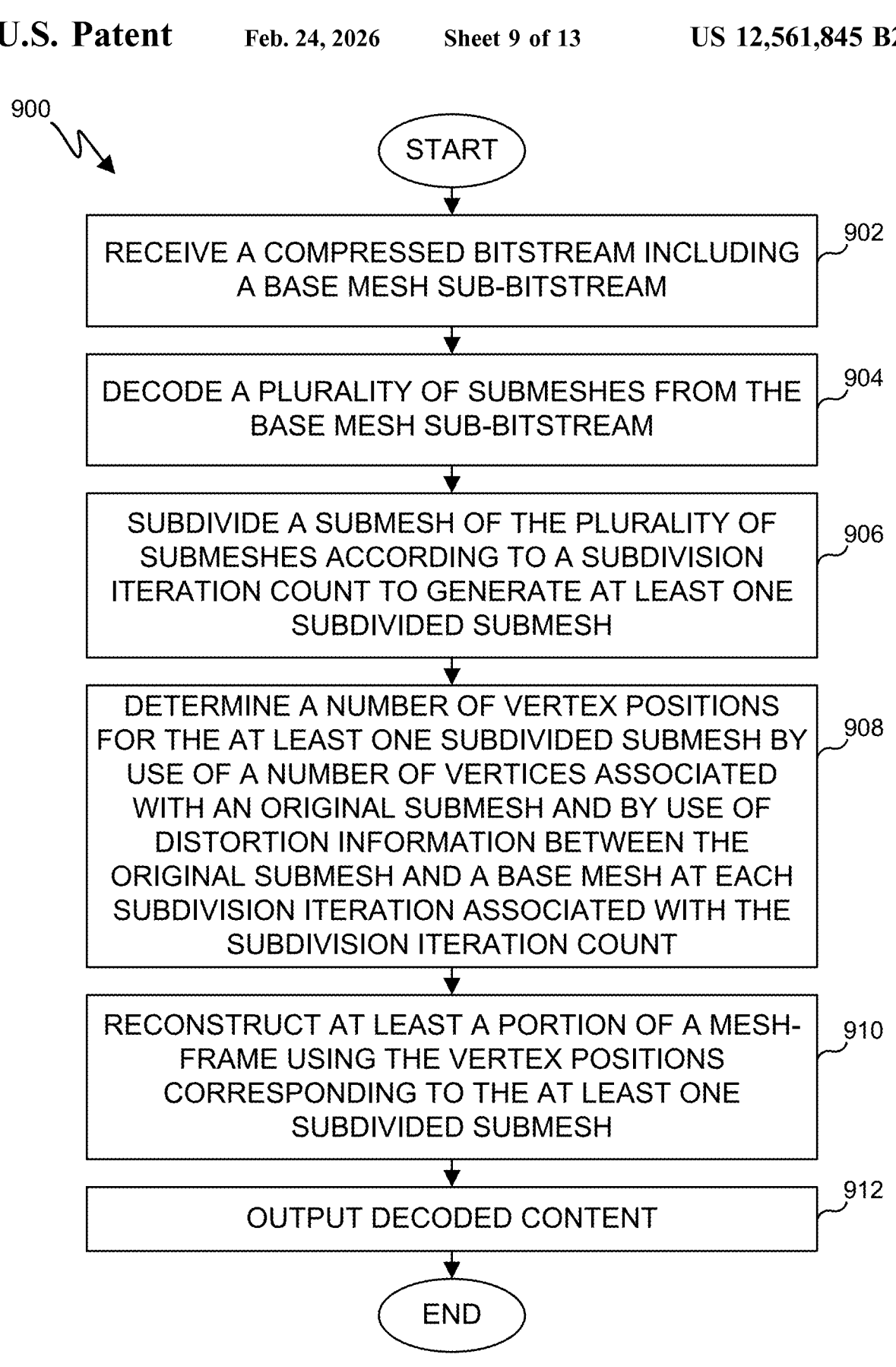

900

START

RECEIVE A COMPRESSED BITSTREAM INCLUDING A BASE MESH SUB-BITSTREAM — 902

DECODE A PLURALITY OF SUBMESHES FROM THE BASE MESH SUB-BITSTREAM — 904

SUBDIVIDE A SUBMESH OF THE PLURALITY OF SUBMESHES ACCORDING TO A SUBDIVISION ITERATION COUNT TO GENERATE AT LEAST ONE SUBDIVIDED SUBMESH — 906

DETERMINE A NUMBER OF VERTEX POSITIONS FOR THE AT LEAST ONE SUBDIVIDED SUBMESH BY USE OF A NUMBER OF VERTICES ASSOCIATED WITH AN ORIGINAL SUBMESH AND BY USE OF DISTORTION INFORMATION BETWEEN THE ORIGINAL SUBMESH AND A BASE MESH AT EACH SUBDIVISION ITERATION ASSOCIATED WITH THE SUBDIVISION ITERATION COUNT — 908

RECONSTRUCT AT LEAST A PORTION OF A MESH-FRAME USING THE VERTEX POSITIONS CORRESPONDING TO THE AT LEAST ONE SUBDIVIDED SUBMESH — 910

OUTPUT DECODED CONTENT — 912

END

FIGURE 9

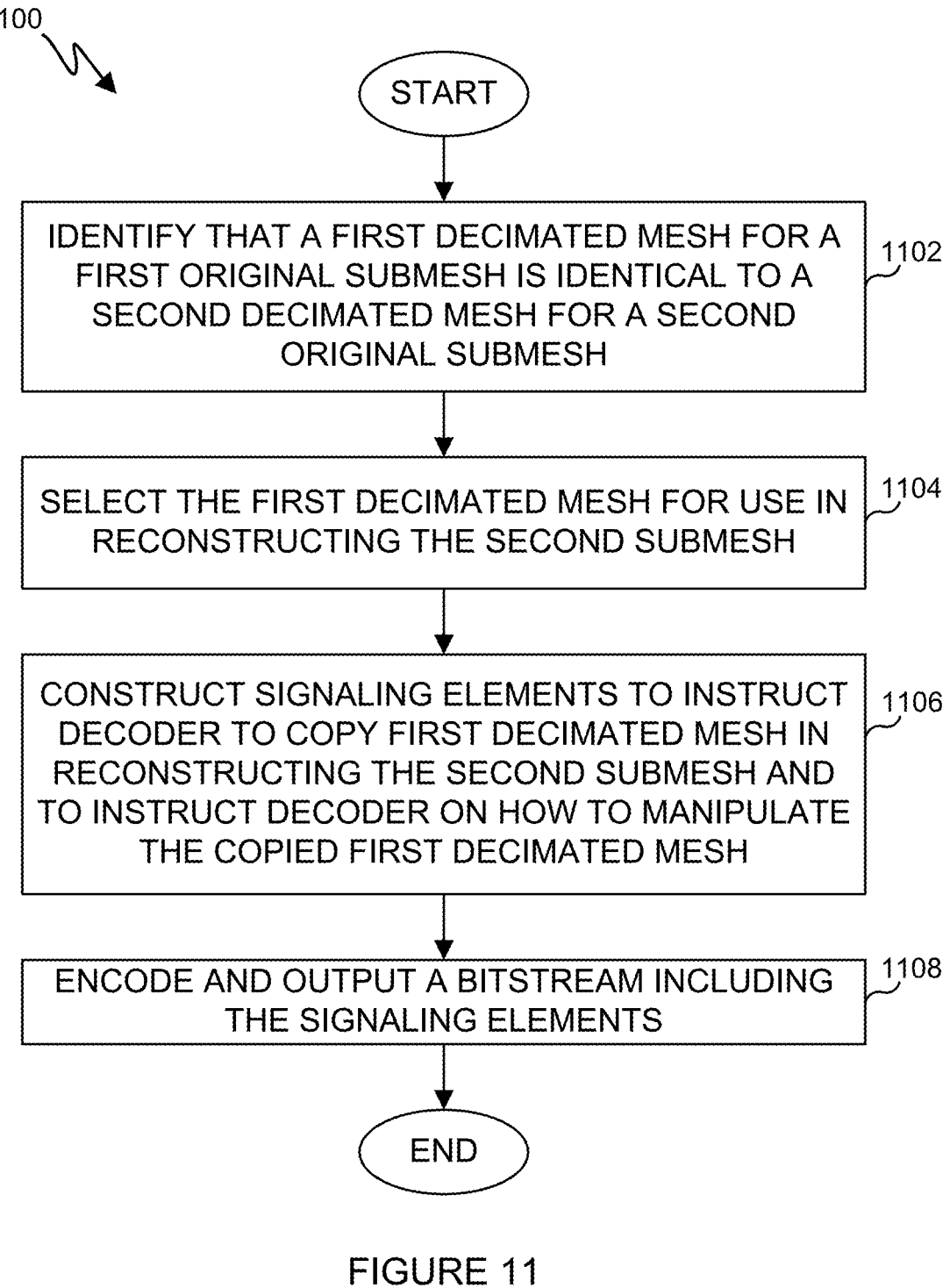

1100

START

IDENTIFY THAT A FIRST DECIMATED MESH FOR A FIRST ORIGINAL SUBMESH IS IDENTICAL TO A SECOND DECIMATED MESH FOR A SECOND ORIGINAL SUBMESH          1102

SELECT THE FIRST DECIMATED MESH FOR USE IN RECONSTRUCTING THE SECOND SUBMESH          1104

CONSTRUCT SIGNALING ELEMENTS TO INSTRUCT DECODER TO COPY FIRST DECIMATED MESH IN RECONSTRUCTING THE SECOND SUBMESH AND TO INSTRUCT DECODER ON HOW TO MANIPULATE THE COPIED FIRST DECIMATED MESH          1106

ENCODE AND OUTPUT A BITSTREAM INCLUDING THE SIGNALING ELEMENTS          1108

END

FIGURE 11

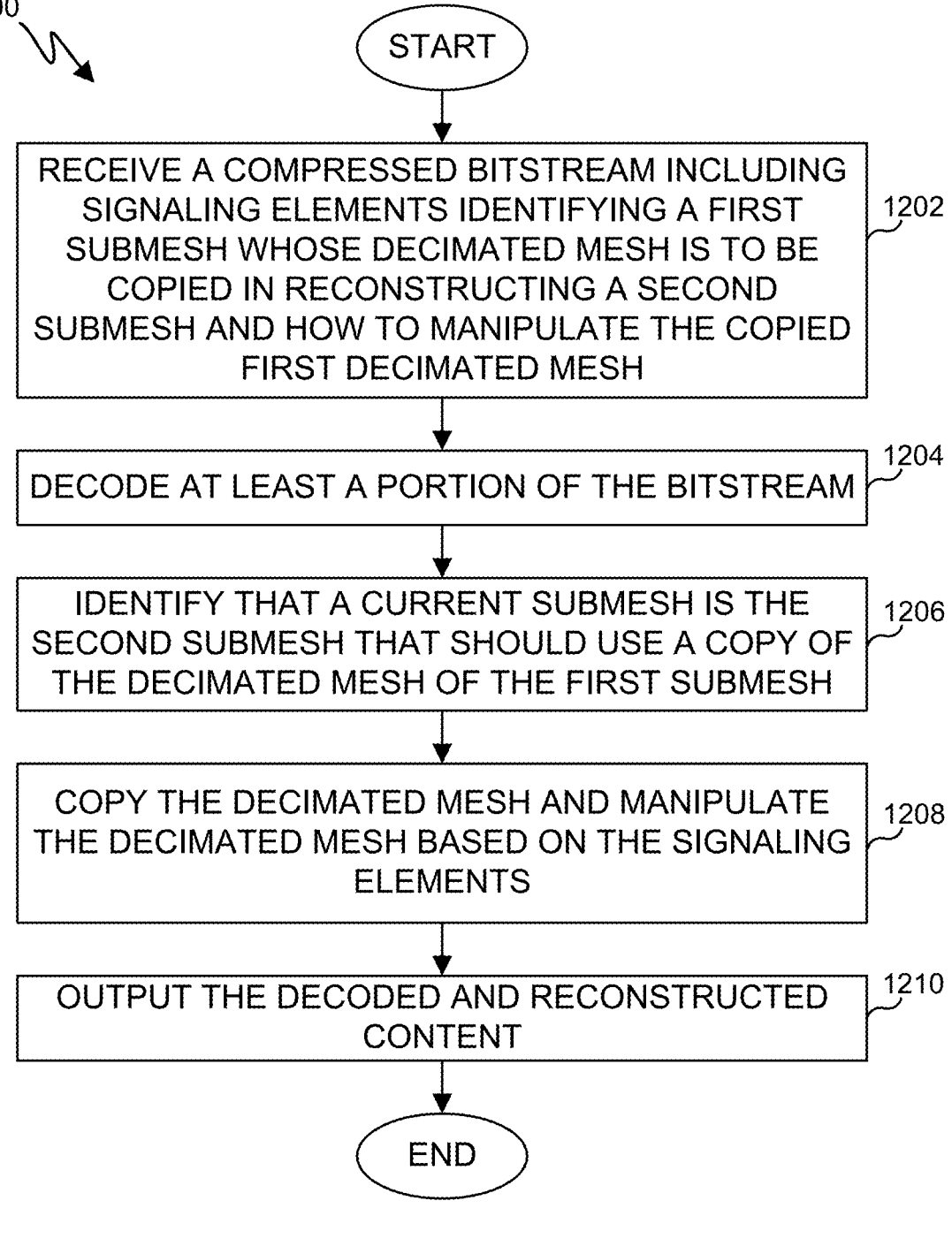

1200

START

RECEIVE A COMPRESSED BITSTREAM INCLUDING
SIGNALING ELEMENTS IDENTIFYING A FIRST
SUBMESH WHOSE DECIMATED MESH IS TO BE
COPIED IN RECONSTRUCTING A SECOND
SUBMESH AND HOW TO MANIPULATE THE COPIED
FIRST DECIMATED MESH                                    1202

DECODE AT LEAST A PORTION OF THE BITSTREAM          1204

IDENTIFY THAT A CURRENT SUBMESH IS THE
SECOND SUBMESH THAT SHOULD USE A COPY OF
THE DECIMATED MESH OF THE FIRST SUBMESH            1206

COPY THE DECIMATED MESH AND MANIPULATE
THE DECIMATED MESH BASED ON THE SIGNALING
ELEMENTS                                                1208

OUTPUT THE DECODED AND RECONSTRUCTED
CONTENT                                                 1210

END

FIGURE 12

DISTORTION INFORMATION FOR EACH ITERATION OF VERTICES RECONSTRUCTION

CROSS-REFERENCE TO RELATED APPLICATION AND PRIORITY CLAIM

This application claims priority under 35 U.S.C. § 119(e) to U.S. Provisional Patent Application No. 63/460,220 filed on Apr. 18, 2023, U.S. Provisional Patent Application No. 63/460,352 filed on Apr. 19, 2023, and U.S. Provisional Patent Application No. 63/542,910 filed on Oct. 6, 2023, which are hereby incorporated by reference in their entirety.

TECHNICAL FIELD

This disclosure relates generally to multimedia devices and processes. More specifically, this disclosure relates to using distortion information for each iteration of vertices reconstruction.

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

SUMMARY

This disclosure provides for using distortion information for each iteration of vertices reconstruction.

In a first embodiment, an apparatus includes a communication interface configured to receive a compressed bitstream including a base mesh sub-bitstream and a processor operably coupled to the communication interface. The processor is configured to decode a plurality of submeshes from the base mesh sub-bitstream. The processor is also configured to subdivide a submesh of the plurality of submeshes according to a subdivision iteration count to generate at least one subdivided submesh, including determine a number of vertex positions for the at least one subdivided submesh by use of a number of vertices associated with an original submesh and by use of distortion information between the original submesh and a base mesh at each subdivision iteration associated with the subdivision iteration count. The processor is also configured to reconstruct at least a portion of a mesh-frame using the vertex positions corresponding to the at least one subdivided submesh.

In a second embodiment, a method includes receiving a compressed bitstream including a base mesh sub-bitstream. The method also includes decoding a plurality of submeshes from the base mesh sub-bitstream. The method also includes subdividing a submesh of the plurality of submeshes according to a subdivision iteration count to generate at least one subdivided submesh, including determining a number of vertex positions for the at least one subdivided submesh by using a number of vertices associated with an original submesh and by using distortion information between the original submesh and a base mesh at each subdivision iteration associated with the subdivision iteration count. The method also includes reconstructing at least a portion of a mesh-frame using the vertex positions corresponding to the at least one subdivided submesh.

In a third embodiment, an apparatus includes a communication interface and a processor operably coupled to the communication interface. The processor is configured to subdivide a submesh according to a subdivision iteration count to generate at least one subdivided submesh having vertex positions. The processor is also configured to determine a number of vertices associated with the submesh to be used to simplify the vertex positions. The processor is also configured to determine distortion information between the submesh and a base mesh at each subdivision iteration associated with the subdivision iteration count. The processor is also configured to reconstruct at least a portion of a mesh-frame using the vertex positions of the at least one subdivided submesh. The processor is also configured to create a compressed bitstream including information on the submesh, the subdivision iteration count, the number of vertices associated with the submesh, and the distortion information.

In a fourth embodiment, a method includes subdividing a submesh according to a subdivision iteration count to generate at least one subdivided submesh having vertex positions. The method also includes determining a number of vertices associated with the submesh to be used to simplify the vertex positions. The method also includes determining distortion information between the submesh and a base mesh at each subdivision iteration associated with the subdivision iteration count. The method also includes reconstructing at least a portion of a mesh-frame using the vertex positions of the at least one subdivided submesh. The method also includes creating a compressed bitstream including information on the submesh, the subdivision iteration count, the number of vertices associated with the submesh, and the distortion information.

In a fifth embodiment, an apparatus includes a communication interface configured to receive a compressed bitstream including signaling elements identifying a first submesh whose decimated mesh is to be copied in reconstructing a second submesh and how to manipulate the copied first decimated mesh and a processor operably coupled to the communication interface. The processor is configured to decode at least a portion of the bitstream. The processor is further configured to identify that a current submesh is the second submesh that should use a copy of the decimated mesh of the first submesh. The processor is further configured to copy the decimated mesh and manipulate the decimated mesh based on the signaling elements. The processor is further configured to output the decoded and reconstructed content.

In a sixth embodiment, a method includes receiving a compressed bitstream including signaling elements identifying a first submesh whose decimated mesh is to be copied in reconstructing a second submesh and how to manipulate the copied first decimated mesh and a processor operably coupled to the communication interface. The method also includes decoding at least a portion of the bitstream. The method also includes identifying that a current submesh is the second submesh that should use a copy of the decimated mesh of the first submesh. The method also includes copying the decimated mesh and manipulating the decimated mesh based on the signaling elements. The method also includes outputting the decoded and reconstructed content.

In a seventh embodiment, an apparatus includes a communication interface and a processor operably coupled to the communication interface. The processor is configured to identify that a first decimated mesh for a first original submesh is identical to a second decimated mesh for a second original submesh. The processor is further configured to select the first decimated mesh for use in reconstructing the second submesh. The processor is further configured to construct signaling elements to instruct decoder to copy first decimated mesh in reconstructing the second submesh and to instruct decoder on how to manipulate the copied first decimated mesh. The processor is further configured to encode and output a bitstream including the signaling elements.

In an eighth embodiment, a method includes identifying that a first decimated mesh for a first original submesh is identical to a second decimated mesh for a second original submesh. The method also includes selecting the first decimated mesh for use in reconstructing the second submesh. The method also includes constructing signaling elements to instruct decoder to copy first decimated mesh in reconstructing the second submesh and to instruct decoder on how to manipulate the copied first decimated mesh. The method also includes encoding and outputting a bitstream including the signaling elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2 and 3 illustrate example electronic devices in accordance with this disclosure;

FIG. 9 illustrates an example decoding method for reconstruction of a simplified submesh in accordance with this disclosure;

FIG. 11 illustrates an example encoding method for creating and signaling duplicated base mesh information in accordance with this disclosure; and FIG. 12 illustrates an example decoding method for using a copied base mesh during mesh reconstruction in accordance with this disclosure.

DETAILED DESCRIPTION

Figure 1:
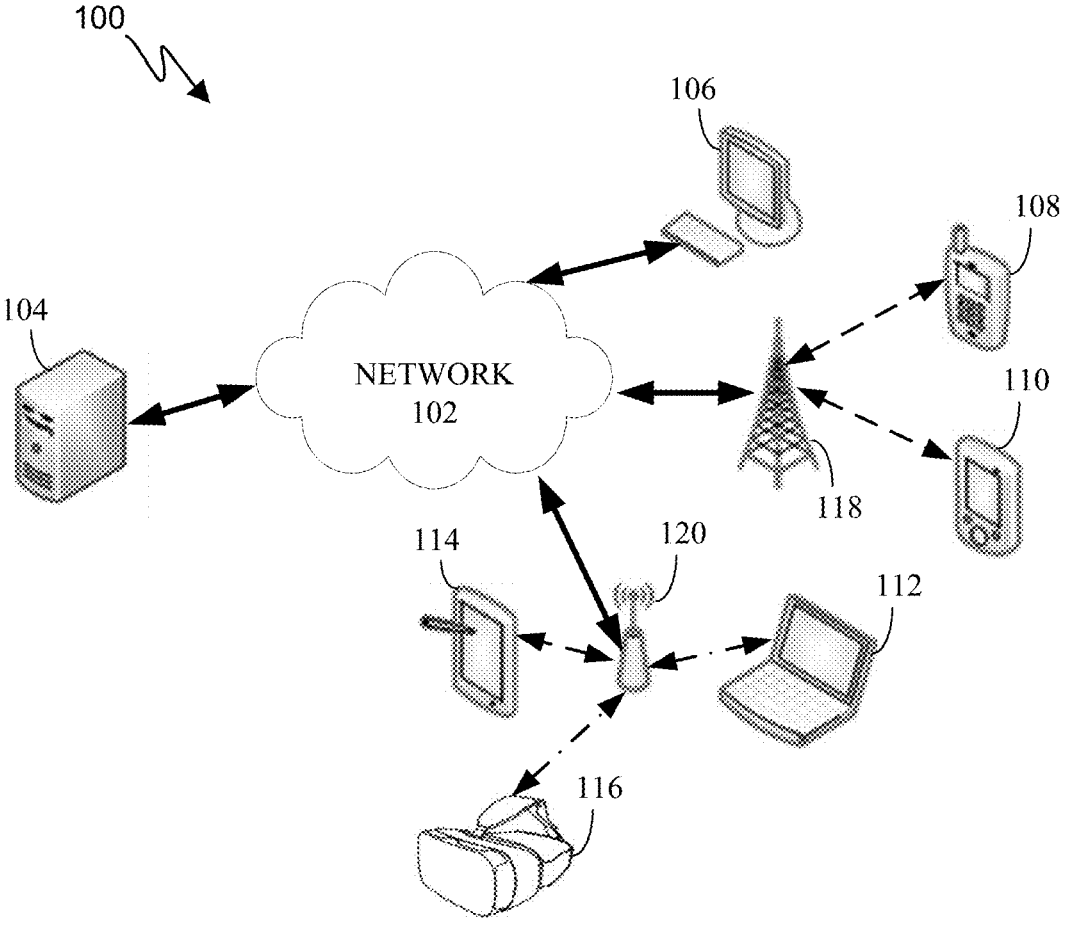
FIG. 1 illustrates an example communication system in accordance with this disclosure.

FIGS. 1 through 12, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

A point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud, often requires specialized hardware. To avoid specialized hardware to compress a 3D point cloud, a 3D point cloud can be transformed into traditional two-dimensional (2D) frames and that can be compressed and later reconstructed and viewable to a user.

Polygonal 3D meshes, especially triangular meshes, are another popular format for representing 3D objects. Meshes typically include a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

As part of an encoding process, a base mesh can be coded using an existing mesh codec, and a reconstructed base mesh can be constructed from the coded original mesh. The reconstructed base mesh can then be subdivided into one or more subdivided meshes and a displacement field is created for each subdivided mesh. For example, if the reconstructed base mesh includes triangles covering the surface of the 3D object, the triangles are subdivided according to a number of subdivision levels, such as to create a first subdivided mesh in which each triangle of the reconstructed base mesh is subdivided into four triangles, a second subdivided mesh in which each triangle of the reconstructed base mesh is subdivided into sixteen triangles, and so on, depending on how many subdivision levels are applied. Each displacement field represents the difference between vertex positions of the original mesh and the subdivided mesh associated with the displacement field. Each displacement field is wavelet transformed to create level of detail (LOD) signals that are encoded as part of a compressed bitstream. During decoding, the displacements of each displacement field are added to their associated subdivided mesh to reconstruct a version of the original mesh.

To create a base mesh and a displacement field, the original mesh is first down-sampled to generate a base curve/polyline, referred to as the "decimated" curve. A subdivision scheme is then applied to the decimated polyline to generate a "subdivided" curve. A subdivision scheme using an iterative interpolation scheme can be applied including inserting at each iteration a new point in the middle of each edge of the polyline. However, the number of vertices of reconstructed mesh might be different from that of the original mesh because the number of vertices of reconstructed mesh increases when the number of subdivision iterations increases. The encoder chooses the number of iteration to reach a certain level of similarity between the original mesh and the reconstructed base mesh. However, the level of similarity chosen by the encoder may not be suitable for various reasons.

For example, when a 3D scene is composed with some number of objects, an object in background of 3D scene may not need to be reconstructed to achieve high similarity, but an object in the front of 3D scene may need to be reconstructed to achieve high similarity. For example, in a six DoF application, each individual user has freedom to choose the location and direction of the view in 3D space, causing the encoder to be unable to decide which object may need high similarity and which may not. It can only be decided by the decoder. In addition, as the number of rounds of interpolation increases, the number of points for a base mesh increases and the distortion between the original mesh and the base mesh decreases. In some cases, the number of vertices of reconstructed mesh may not be the same as that of the original mesh, and often the number of vertices of a base mesh could be larger than that of original mesh. This can create a rendering problem when the renderer has limited capability and so there is a need to simplify objects meet the capability limit of the rendering system. In addition, applying a large number of iterations can be a waste of resources as the reconstructed mesh may not be identical with the original mesh. It thus might be more efficient to apply iterations when the distortion between the original mesh and reconstructed mesh reaches certain points.

This disclosure, therefore, provides using the number of vertices of original mesh as a reference number for simplification without unnecessarily sacrificing quality of the mesh. This disclosure also provides techniques to allow the decoder to understand the similarity between the original mesh and the reconstructed base mesh at each iteration using distortion information at each iteration so that the decoder can choose the number of iterations to be applied to generate the base mesh according to the context of the application and the user.

As noted above, a base mesh, which is a decimated version of an original mesh to minimize the amount of compressed data, is created. Since the original mesh is decimated into a simplified version, in some cases the base mesh created for two different original meshes could be the same even though the two original meshes are different. This can lead to instances where there might be more than one identical base mesh that is generated, stored, and used, causes a waste of resources. This disclosure thus provides for eliminating duplicate base meshes to further improve compression efficiency.

In some instance in this disclosure, the term "submesh" can refers to the partitioning of the base mesh. In some instances, in this disclosure, "submesh" can mean the geometric data that is reconstructed after the submesh is subdivided and displacements added.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can compress a 3D point cloud or mesh to generate a bitstream and then transmit the bitstream to one or more of the client devices 106-116. As another example, one of the client devices 106-116 can compress a 3D point cloud or mesh to generate a bitstream and then transmit the bitstream to another one of the client devices 106-116 or to the server 104. In accordance with this disclosure, the server 104 and/or the client devices 106-116 can use a number of vertices of the original mesh and/or distortion information for each reconstruction iteration to simplify submeshes. Additionally or alternatively, in accordance with this disclosure, the server 104 and/or the client devices 106-116 can use a copy of a decimated mesh for reconstructing one or more submeshes. In some embodiments, the server 104 and/or the client devices 106-116 can construct and transmit signaling information instructing another device to use a number of vertices of the original mesh and/or distortion information for each reconstruction iteration to simplify submeshes and/or create and use a copy of a decimated mesh for reconstructing one or more submeshes.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration.

While FIG. 1 illustrates one operational environment in which various features disclosed in this patent document can be used, these features could be used in any other suitable system.

Figure 3:
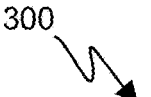

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can use a number of vertices of the original mesh and/or distortion information for each reconstruction iteration to simplify submeshes. Additionally or alternatively, the processor 210 can create and use a copy of a decimated mesh for reconstructing one or more submeshes as described in this disclosure. In some embodiments, the processor 210 can construct and transmit signaling information instructing another device to use a number of vertices of the original mesh and/or distortion information for each reconstruction iteration to simplify submeshes and/or create and use a copy of a decimated mesh for reconstructing one or more submeshes.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

In certain embodiments, the processor 340 can use a number of vertices of the original mesh and/or distortion information for each reconstruction iteration to simplify submeshes. Additionally or alternatively, the processor 340 can create and use a copy of a decimated mesh for reconstructing one or more submeshes as described in this disclosure. In some embodiments, the processor 340 can construct and transmit signaling information instructing another device to use a number of vertices of the original mesh and/or distortion information for each reconstruction iteration to simplify submeshes and/or create and use a copy of a decimated mesh for reconstructing one or more submeshes.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
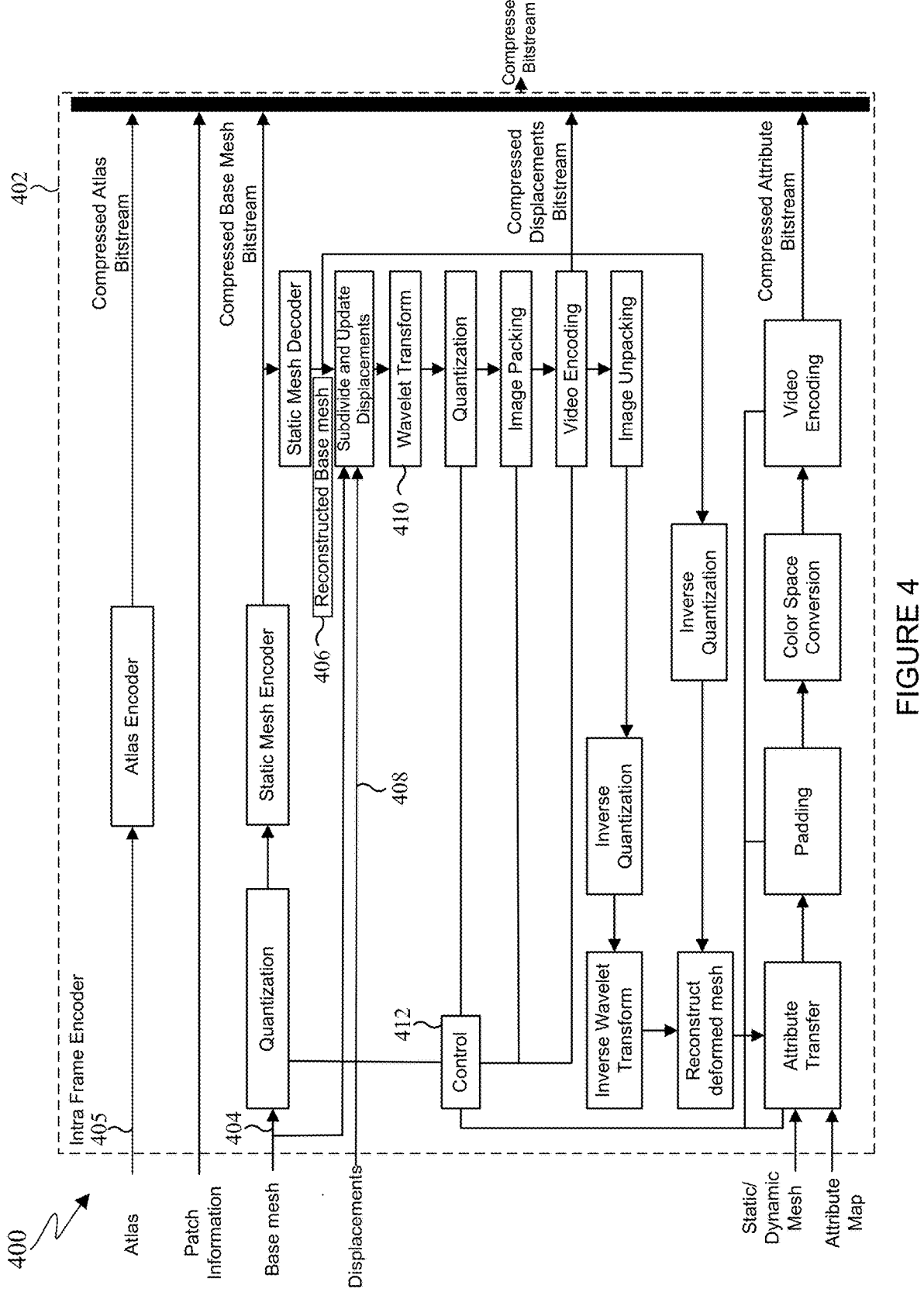
FIG. 4 illustrates an example intra-frame encoding process in accordance with this disclosure.

FIG. 4 illustrates an example intra-frame encoding process 400 in accordance with this disclosure. The intra-frame encoding process 400 illustrated in FIG. 4 is for illustration only. FIG. 4 does not limit the scope of this disclosure to any particular implementation of an intra-frame encoding process. For ease of explanation, the process 400 of FIG. 4 may be described as being performed using the electronic device 300 of FIG. 3. However, the process 400 may be used with any other suitable system and any other suitable electronic device.

As shown in FIG. 4, the intra-frame encoding process 400 encodes a mesh frame using an intra-frame encoder 402. The intra-frame encoder 402 can be represented by, or executed by, the server 200 shown in FIG. 2 or the electronic device 300 shown in FIG. 3. A base mesh 404, which typically has a smaller number of vertices compared to the original mesh, is created and is quantized and compressed in either a lossy or lossless manner, and then encoded as a compressed base mesh bitstream. As shown in FIG. 4, a static mesh decoder decodes and reconstructs the base mesh, providing a reconstructed base mesh 406. This reconstructed base mesh 406 then undergoes one or more levels of subdivision and a displacement field is created for each subdivision representing the difference between the original mesh and the subdivided reconstructed base mesh. In inter-coding of a mesh frame, the base mesh 404 is coded by sending vertex motions instead of compressing the base mesh directly. In either case, a displacement field 408 is created. Each displacement of the displacement field 408 has three components, denoted by x, y, and z. These may be with respect to a canonical coordinate system or a local coordinate system where x, y, and z represent the displacement in local normal, tangent, and bi-tangent directions. It will be understood that multiple levels of subdivision can be applied, such that multiple subdivided mesh frames are created and a displacement field for each subdivided mesh frame is also created.

Let the number of 3-D displacement vectors in a displacement 408 of a mesh-frame be N. Let the displacement field be denoted by $d(i)=[d_x(i), d_y(i), d_z(i)]$, $0 \leq i < N$. The displacement fields 408 undergo one or more levels of wavelet transformation 410 to create level of detail (LOD) signals $d^k(i)$, $i=0 \leq i < N^k$, $0 \leq k < numLOD$, where k denotes the index of the level of detail, $N^k$ denotes the number of samples in the level of detail signal at level k, and numLOD denotes the number of LODs. The LOD signals $d^k(i)$ are scalar quantized.

As shown in FIG. 4, the quantized LOD signals corresponding to the displacement fields 408 are coded into a compressed bitstream. In various embodiments, the quantized LOD signals are packed into a 2D image/video using an image packing operation, and are compressed losslessly or in a lossy manner by using an image or video encoder. However, it is possible to use another entropy coder such as an asymmetric numeral systems (ANS) coder or a binary arithmetic entropy coder to code the quantized LOD signals losslessly. There may be other dependencies based on previous samples, across components, and across LODs that may be exploited. The displacements component provides displacement vectors that can be encoded as a geometry video component using any video codec, indicated by the profile or using an SEI message. Alternatively, the profile may indicate that the displacement component is encoded using arithmetic coding.

As also shown in FIG. 4, image unpacking of the LOD signals is performed and an inverse quantization operation and an inverse wavelet transform operation are performed to reconstruct the LOD signals. Another inverse quantization operation is performed on the reconstructed base mesh 406, which is combined with the reconstructed LOD signals to reconstruct a deformed mesh. An attribute transfer operation is performed using the deformed mesh, a static/dynamic mesh, and an attribute map. A point cloud is a set of 3D points along with attributes such as color, normals, reflectivity, point-size, etc. that represent an object's surface or volume. These attributes are encoded as a compressed attribute bitstream. As shown in FIG. 4, the encoding of the compressed attribute bitstream may also include a padding operation, a color space conversion operation, and a video encoding operation. In various embodiments, an atlas 405 can also be encoded as a compressed atlas bitstream. The atlas component provides information to a decoding and/or rendering system on how to perform inverse reconstruction. For example, the atlas can provide information on how to perform the subdivision of a base mesh, how to apply the displacement vectors to the subdivided mesh vertices, and how to apply attributes to the reconstructed mesh.

The various functions or operations shown in FIG. 4 can be controlled by a control process 412. The intra-frame encoding process 400 outputs the compressed bitstream that can, for example, be transmitted to, and decoded by, an electronic device such as the server 104 or the client devices 106-116. As shown in FIG. 4, the output compressed bitstream can include the compressed atlas bitstream, the compressed base mesh bitstream, the compressed displacements bitstream, and the compressed attribute bitstream as sub-bitstreams of the compressed bitstream.

Although FIG. 4 illustrates one example intra-frame encoding process 400, various changes may be made to FIG. 4. For example, the number and placement of various components of the intra-frame encoding process 400 can vary as needed or desired. In addition, the intra-frame encoding process 400 may be used in any other suitable process and is not limited to the specific processes described above. In certain embodiments, only the first (x) component of the displacement may be created and coded, and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement field 408. As another example, the intra-frame encoding process 400 of FIG. 4 can include encoding the bitstream and/or implementing appropriate signaling to allow decoder to use a number of vertices of the original mesh and/or distortion information for each reconstruction iteration to simplify submeshes and/or to create and use a copy of a decimated mesh for reconstructing one or more submeshes as described in this disclosure.

Figure 5:
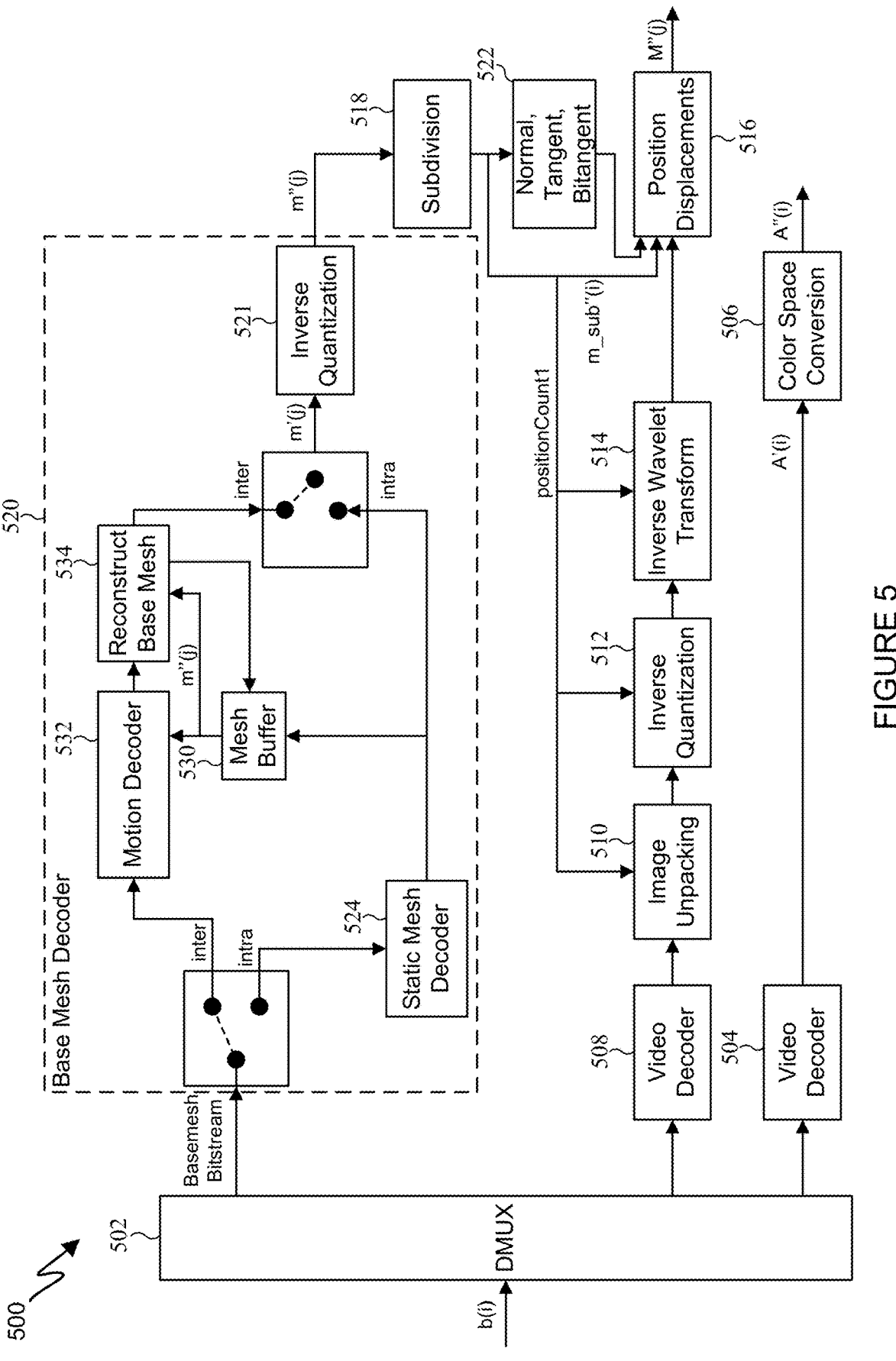
FIG. 5 illustrates an example mesh frame decoding process in accordance with this disclosure.

FIG. 5 illustrates an example mesh frame decoding process 500 in accordance with this disclosure. The frame decoding process 500 illustrated in FIG. 5 is for illustration only. FIG. 5 does not limit the scope of this disclosure to any particular implementation of a mesh frame decoding process. For ease of explanation, the process 500 of FIG. 5 may be described as being performed using the electronic device 300 of FIG. 3. However, the process 500 may be used with any other suitable system and any other suitable electronic device.

The decoding process 500 involves a demultiplexer 502 that receives an incoming bitstream. The demultiplexer separates out the various component bitstreams from the incoming bitstream, including the compressed base mesh bitstream, the compressed displacements bitstream, and the compressed attribute bitstream, such as described with respect to FIG. 4. The compressed attribute bitstream is decoded using a video decoder 504, the decoded attributes are processed using a color space conversion operation 506, and the original attributes for the mesh are recovered.

The decoding process 500 also includes decoding the displacements bitstream using a video decoder 508, which can, in some embodiments, be the same video decoder as the video decoder 504. The decoded displacements data undergoes an image unpacking operation 510, an inverse quantization operation 512, and an inverse wavelet transform operation 514, as part of recovering the positions displacements data 516. Recovering the positions displacements data 516 can also include performing one or more subdivision operations 518 on the mesh frame recovered using a base mesh decoder 520, and extracting x, y, z components 522 (normal, tangent, bitangent) from the subdivided mesh frames. The base mesh decoder 520 can perform an inverse quantization operation 521 before the subdivision operation 518 is performed.

The base mesh decoder 520 takes the base mesh bitstream provided by the demultiplexer 502 and reconstructs, from the base mesh bitstream, intra base mesh frames using a static mesh decoder 524. A mesh buffer 530 provides the decoded intra frames to a motion decoder 532. The motion decoder 532 also receives inter frame data and uses the intra frame data, inter frame data, and associated tables to reconstruct a base mesh at step 534.

Although FIG. 5 illustrates one example frame decoding process 500, various changes may be made to FIG. 5. For example, the number and placement of various components of the frame decoding process 500 can vary as needed or desired. In addition, the frame decoding process 500 may be used in any other suitable process and is not limited to the specific processes described above. Also, while shown as a series of steps, various steps in FIG. 5 may overlap, occur in parallel, or occur any number of times. Additionally, as described with respect to FIG. 4, an atlas bitstream can also be decoded to obtain an atlas that provides information on how to perform inverse reconstruction. For example, the atlas can provide information on how to perform the subdivision of a base mesh, how to apply the displacement vectors to the subdivided mesh vertices, and how to apply attributes to the reconstructed mesh.

Figure 6:
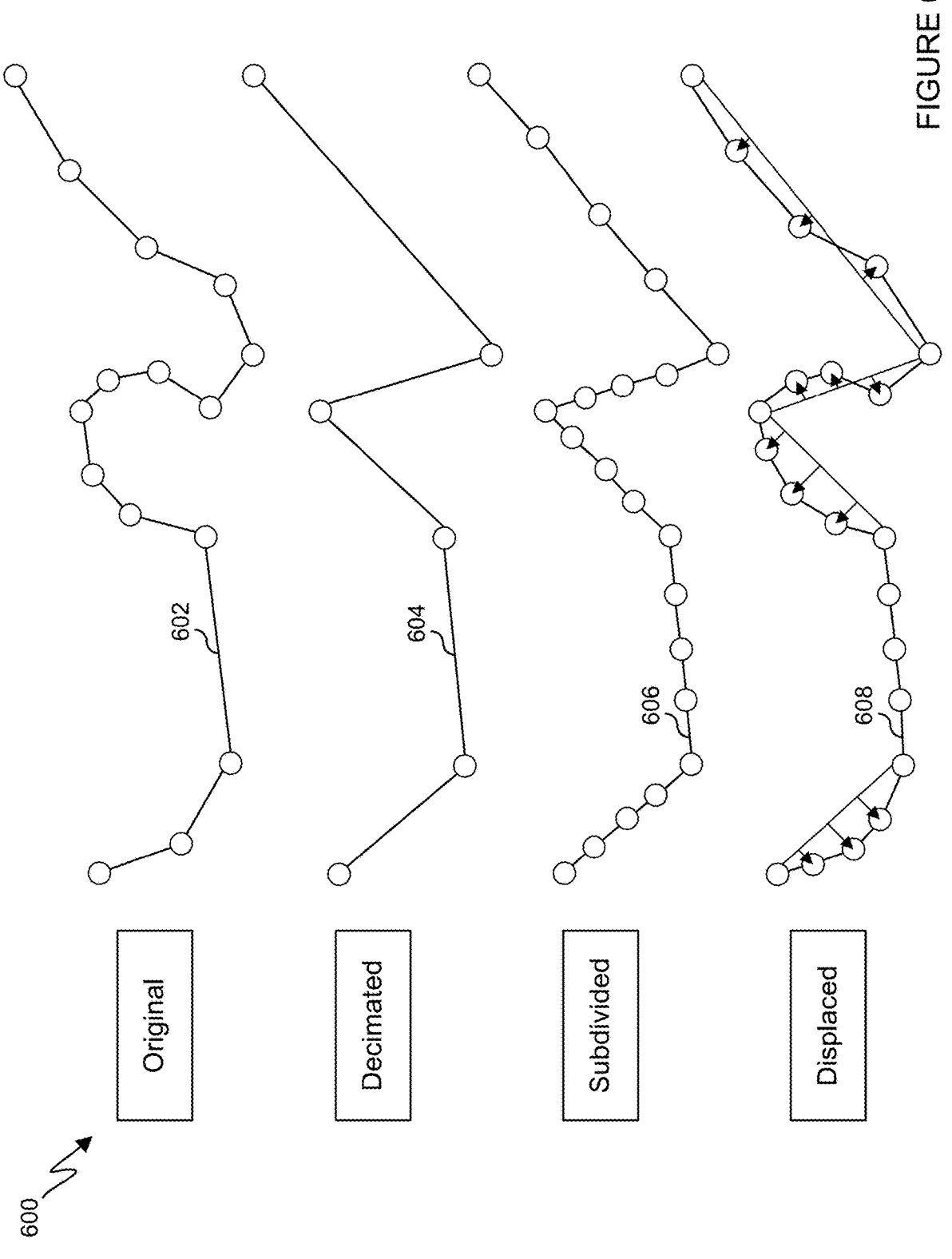
FIG. 6 illustrates an example process for reconstructing a submesh in accordance with this disclosure.

FIG. 6 illustrates an example process 600 for reconstructing a submesh in accordance with this disclosure. The process 600 illustrated in FIG. 6 is for illustration only. FIG. 6 does not limit the scope of this disclosure to any particular implementation of a process for reconstructing a submesh. For ease of explanation, the process 600 of FIG. 6 may be described as being performed using the electronic device 300 of FIG. 3. However, the process 600 may be used with any other suitable system and any other suitable electronic device.

As shown in FIG. 6, to create a base mesh and a displacement field, an original mesh 602 is first downsampled to generate a base curve/polyline, referred to as the decimated curve or mesh 604. A subdivision scheme is then applied to the decimated polyline to generate a subdivided curve or mesh 606. For example, as shown in FIG. 6, a subdivision scheme using an iterative interpolation scheme is applied including inserting at each iteration a new point in the middle of each edge of the polyline. Displacement data can then be used to shift the vertices to more closely match the original mesh 602 and create a reconstructed curve or mesh 608.

However, as shown in FIG. 6, the number of vertices of reconstructed mesh 608 might be different from that of the original mesh 602 because the number of vertices of reconstructed mesh 608 increases when the number of subdivision iterations increases. The encoder typically chooses the number of iteration to reach a certain level of similarity between the original mesh 602 and the reconstructed base mesh 608. However, the level of similarity chosen by the encoder may not be suitable for various reasons.

For example, when a 3D scene is composed with some number of objects, an object in background of 3D scene may not need to be reconstructed to achieve high similarity, but an object in the front of 3D scene may need to be reconstructed to achieve high similarity. For example, in a six DoF application, each individual user has freedom to choose the location and direction of the view in 3D space, causing the encoder to be unable to decide which object may need high similarity and which may not. It can only be decided by the decoder. In addition, as the number of rounds of interpolation increases, the number of points for a base mesh increases and the distortion between the original mesh and the base mesh decreases. In some cases, the number of vertices of reconstructed mesh 608 may not be the same as that of the original mesh 602, and often the number of vertices of a base mesh 604 could be larger than that of the original mesh 602. This can create a rendering problem when the renderer has limited capability and so there is a need to simplify objects meet the capability limit of the rendering system. In addition, applying a large number of iterations can be a waste of resources as the reconstructed mesh 608 may not be identical to the original mesh 602. It thus might be more efficient to apply iterations when the distortion between the original mesh 602 and reconstructed mesh 608 reaches certain points.

This disclosure, therefore, provides using the number of vertices of original mesh as a reference number for simplification without unnecessarily sacrificing quality of the mesh. This disclosure also provides techniques to allow the decoder to understand the similarity between the original mesh and the reconstructed base mesh at each iteration using distortion information at each iteration so that the decoder can choose the number of iterations to be applied to generate the base mesh according to the context of the application and the user.

Also, since the original mesh 602 is decimated into a simplified version, i.e., the base mesh 604, in some cases the base mesh 604 created for two different original meshes could be the same even though the two original meshes are different. This can lead to instances where there might be more than one identical base mesh that is generated, stored, and used, causes a waste of resources. This disclosure thus provides for eliminating duplicate base meshes to further improve compression efficiency.

Although FIG. 6 illustrates one example process 600 for reconstructing a submesh, various changes may be made to FIG. 6. The process 600 may be used in any other suitable process and is not limited to the specific process described above. Also, while shown as a series of steps, various steps in FIG. 6 may overlap, occur in parallel, or occur any number of times.

Figure 7:
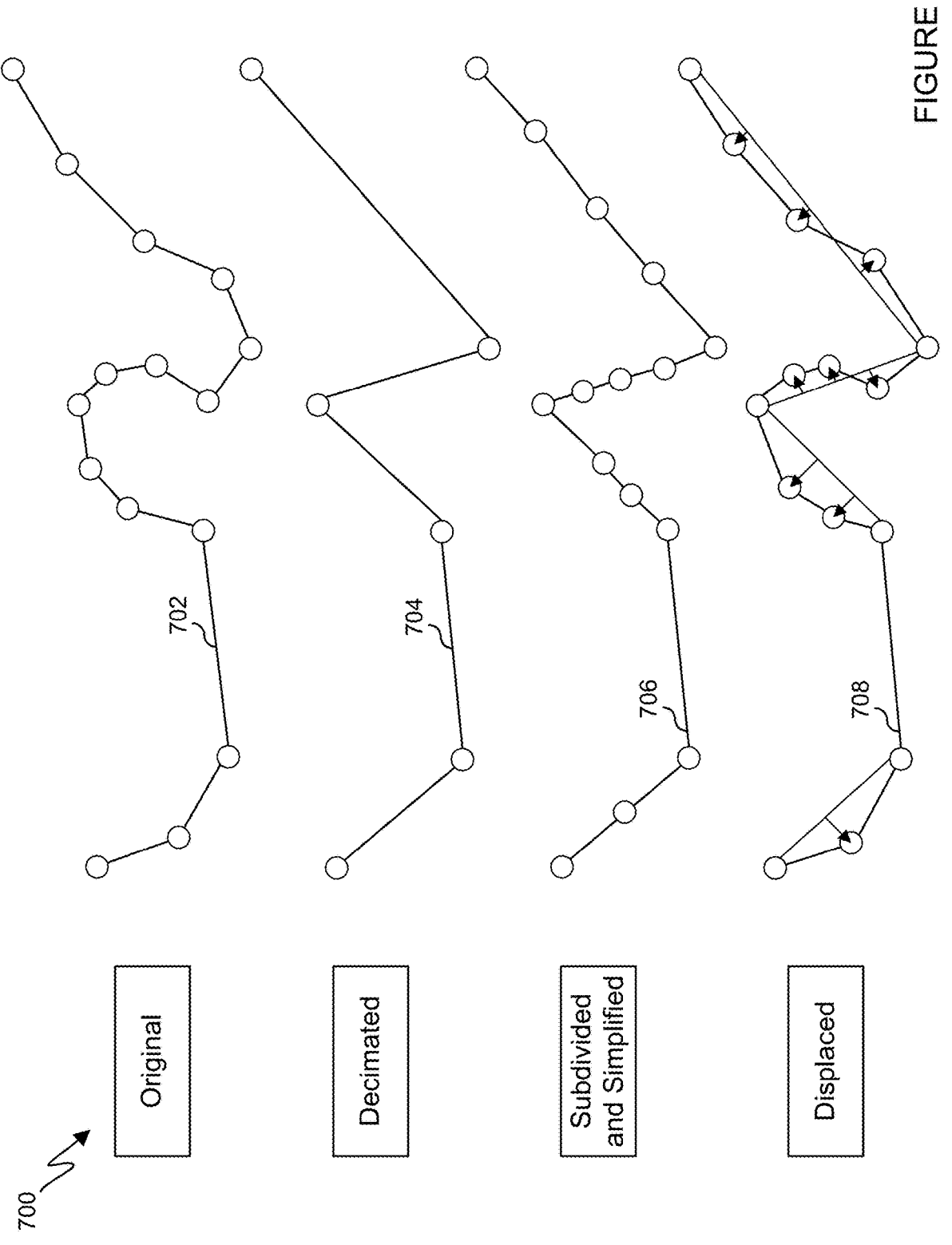
FIG. 7 illustrates an example process for reconstructing a simplified submesh in accordance with this disclosure.

FIG. 7 illustrates an example process 700 for reconstructing a simplified submesh in accordance with this disclosure. The process 700 illustrated in FIG. 7 is for illustration only. FIG. 7 does not limit the scope of this disclosure to any particular implementation of a process for bitstream conformance for reconstructing a simplified submesh. For ease of explanation, the process 700 of FIG. 7 may be described as being performed using the electronic device 300 of FIG. 3. However, the process 700 may be used with any other suitable system and any other suitable electronic device.

As shown in FIG. 7, the process 700 includes downsampling an original mesh 702 into a decimated, or base, mesh 704, similar to that described with respect to FIG. 6. However, in order to avoid the issues described with respect to FIG. 6 of the reconstructed mesh having a larger number of vertices than the original mesh 702, and thus leading to a waste of resources or incompatibilities with certain renderers, a simplified subdivided mesh 706 can be created. The present disclosure provides some methods to indicate the number of vertices of original mesh and the similarity of the base mesh and original mesh at each subdivision iterations.

To simplify the subdivided mesh, in some embodiments, a total number of original vertices per each submesh or patch can be signaled to the decoder. Additionally or alternatively, in some embodiments, distortion information between the original mesh 702 and the reconstructed mesh after each subdivision iteration is signaled per each submesh or patch. In some embodiments, the distortion signaled can be one or more of the following distortion metrics: a point cloud based D1 metric, a point cloud based D2 metric, a point cloud based luma/chroma peak signal-to-noise ratio (PSNR) metric, a rendered image based geometry and luma/chroma PSNR metric, a perceptual based distortion metric, etc.

In some embodiments, subdivision information is signaled with the below syntax by the encoder and the decoder processes the syntax elements and recovers the information about the number of vertices of original mesh and the distortion between original mesh and reconstructed base mesh at each subdivision iterations.

```
number_of_vertices_of_original_submesh
distortion_type
subdivision_iteration_count
for( i == 0 ; i<subdivision_iteration_count ; i++)
    distortion[i]
```

Here, the "number_of_vertices_of_original_submesh" indicates the number of vertices of the original submesh, "distortion_type" indicates the type of distortion metric used, "subdivision_iteration_count" indicates the number of subdivision iteration to be applied to generate the reconstructed mesh 708, and "distortion" indicates the difference between the original mesh 702 and the reconstructed base mesh 708 after an ith subdivision iteration is performed. Available distortion types are listed in Table 1 below.

TABLE 1

| Distortion Metric Types | |
| --- | --- |
| value | metric |
| 0x00 | reserved |
| 0x01 | point cloud based D1 |
| 0x02 | point cloud based D2 |
| 0x03 | point cloud based PSNR |
| 0x04 | rendered image based PSNR |
| 0x05 | perceptual based distortion |
| 0x06-0xFF | reserved |

In some embodiments, a decoding process using this information is as follows:

1. Set the layer_number to 0;
2. decode the layer with layer_number;
3. sub-divide the layer with layer_number;
4. get count of number of vertices in layer with layer_number+1 (based on the number of vertices of subdivided layer with layer_number)–the number of vertices in the layer with layer_number;
5. decode displacement map values in video where the number of displacement map is equal to the number from the step 4;
6. Increase the layer_number by 1;
7. check if the layer_number is equal to the value of subdivision_iteration_count. If yes then go to the step 8. If no then go to the step 2; and
8. finish.

Various standards have been proposed with respect to vertex mesh and dynamic mesh coding. The following documents are hereby incorporated by reference in their entirety as if fully set forth herein:

"V-Mesh Test Model v1," ISO/IEC SC29 WG07 N00404, July 2022;

"V-DMC Test Model v2 (TMM v2)," ISO/IEC SC29 WG07 N00456, October 2022;

"V-DMC Test Model v3 (TMM v3)," ISO/IEC SC29 WG07 N00530, February 2023;

"WD 1.0 of V-DMC," ISO/IEC SC29 WG07, N00486, December 2023;

"WD 2.0 of V-DMC," ISO/IEC SC29 WG07 N00546, February 2023;

"WD 3.0 of V-DMC," ISO/IEC SC29 WG07 N00611, May 2023;

"WD 4.0 of V-DMC," ISO/IEC JTC 1/SC 29/WG 07 N00611, August 2023; and

"WD 5.0 of V-DMC," ISO/IEC JTC 1/SC 29/WG 7 N00744, August 2023.

"WD of V-DMC," ISO/IEC JTC 1/SC 29/WG 7 N00822, August 2023.

In some embodiments, Supplemental Enhancement Information (SEI) message can be used. For example, the SEI message can be used to indicate the number of vertices of the original mesh 702 and the similarity of the base mesh 704 and original mesh 702 at each subdivision iterations is defined. For example, the syntax of the SEI message can indicate a total number of original vertices per each submesh or patch. Distortion information between the original mesh and the reconstructed base mesh after each subdivision iteration can also be signaled per each submesh or patch. The following semantics can be defined:

Submesh Distortion Indication SEI Payload Syntax

| | Descriptor |
|---|---|
| submesh_distortion_indication( payloadSize ) { | |
|    sdi_number_of_submesh_indicated | ue(v) |
|    sdi_submesh_id_length_minus1 | ue(v) |
|    for( i = 0; i < sdi_number_of_submesh_indicated; i++ ) { | |
|       sdi_submesh_id[ i ] | u(v) |
|       sdi_number_of_vertices_of_original_submesh[ i ] | ue(v) |
|       sdi_subdivision_iteration_count[ i ] | ue(v) |
|       sdi_number_of_distortion_indicated_minus1[ i ] | ue(v) |
|       for( j = 0; j < sdi_number_of_distortion_indicated_minus1 + 1; j++ ) { | |
|          sdi_distortion_metrics_type[ i ][ j ] | u(8) |
|          for( k = 0; j < sdi_subdivision_iteration_count; k++ ) | |
|             sdi_distortion[ i ][ j ][ k ] | ue(v) |
|       } | |
|    } | |
| } | |

Various embodiments can use the semantics as described above. The SEI message indicates the number of vertices of the original submesh and the similarity of the base mesh and original mesh at each subdivision iterations so that the decoder can estimate the loss of quality of decoded submesh. In some cases, the reconstruction process can be stopped at a certain number of iterations by using similarity information provided by the SEI message when an estimated quality of the reconstructed submesh is sufficient for the intended use.

In the above semantics, "sdi_number_of_submesh_indi-cated" indicates the number of submesh similarity information signaled by this SEI message, "sdi_submesh_id_length_ minus1 plus 1" specifies the number of bits used to represent the syntax element sdi_submesh_id[i], where "sdi_ submesh_id[i]" indicates the identifier of the i-th submesh. The number of bits used to represent "sdi_sub-mesh_id[i]" is "sdi_submesh_id_length_minus1+1." Also, "sdi_number_of_vertices_of_original_submesh[i]" indi-cates the number of vertices of original submesh and "sdi_ subdivision_iteration_count[i]" indicates the number of sub-division iteration to be applied to generate reconstructed base mesh. Additionally, "sdi_number_of_distortion_indi-cated_minus1[i] plus 1" indicates the number of distortion associated with i-th submesh signalled by the SEI message. Also, "sdi_distortion_metrics_type[i][j]" indicates the type of distortion metric for the j-th distortion of the i-th sub-mesh. Available example distortion metric types are listed in Table 1. Also, "sdi_distortion[i][j][k]" indicates the j-th distortion metric between original mesh and reconstructed j-th submesh after k-th subdivision iteration is performed.

As shown in FIG. 7, after the simplified subdivided mesh 706 is created, displacement data can still be used to shift the simplified number of vertices and output a reconstructed mesh 708 having a number of vertices matching or similar to the original mesh 702.

Although FIG. 7 illustrates one example process 700 for reconstructing a simplified submesh, various changes may be made to FIG. 7. The 700 may be used in any other suitable process and is not limited to the specific process described above. Also, while shown as a series of steps, various steps in FIG. 7 may overlap, occur in parallel, or occur any number of times.

Figure 8:
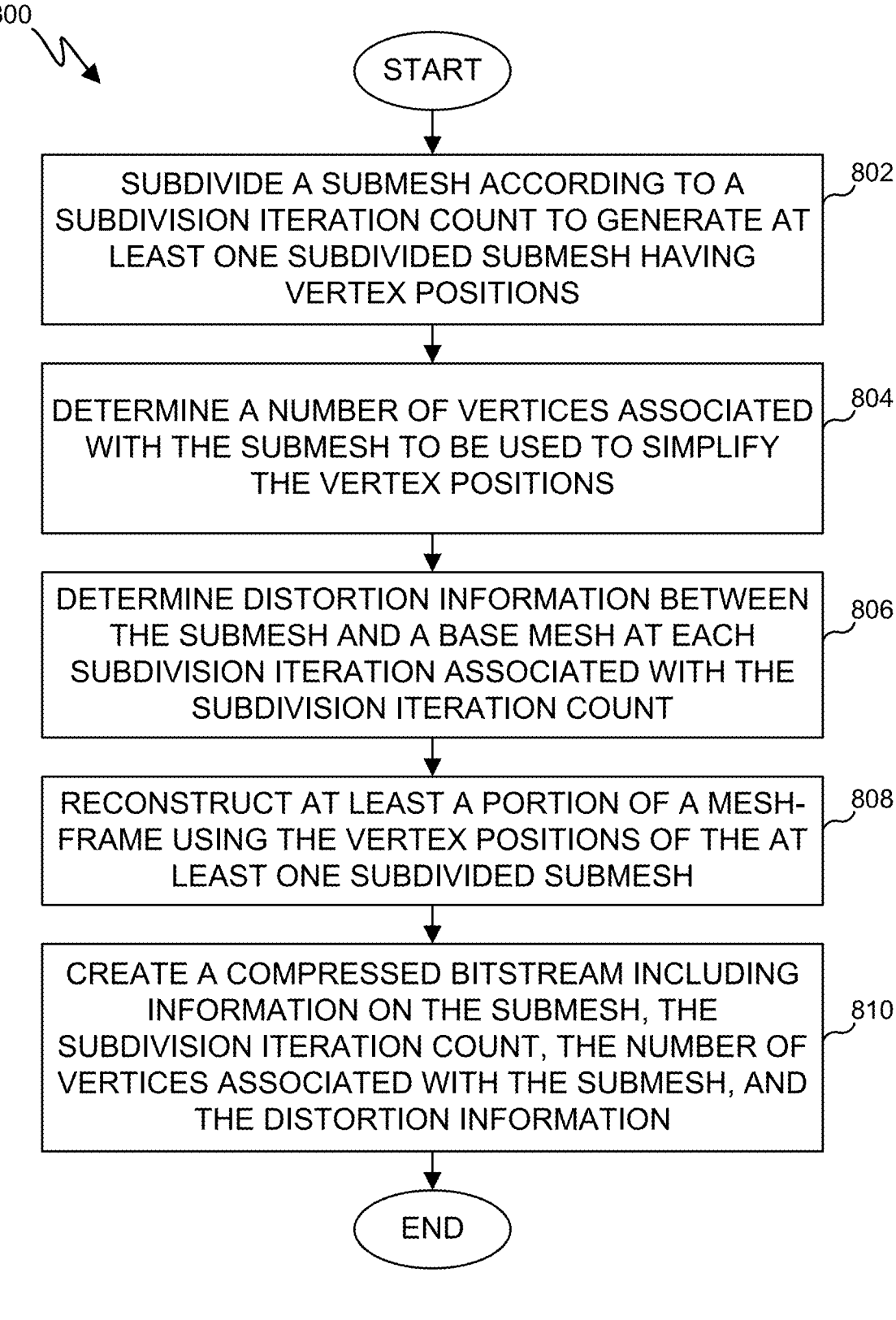
FIG. 8 illustrates an example encoding method allowing for reconstruction of a simplified submesh in accordance with this disclosure.

FIG. 8 illustrates an example encoding method 800 allow-ing for reconstruction of a simplified submesh in accordance with this disclosure. For ease of explanation, the method 800 of FIG. 8 is described as being performed using the elec-tronic device 300 of FIG. 3. However, the method 800 may be used with any other suitable system and any other suitable electronic device.

As shown in FIG. 8, at step 802, the electronic device 300 subdivides a submesh according to a subdivision iteration count to generate at least one subdivided submesh having vertex positions. At step 804, the electronic device 300 determines a number of vertices associated with the sub-mesh to be used to simplify the vertex positions. At step 806, the electronic device 300 determines distortion information between the submesh and a base mesh at each subdivision iteration associated with the subdivision iteration count. As described in this disclosure, the distortion information can include a distortion metric type including at least one of a point cloud based point-to-point (D1) metric, a point cloud based point-to-plane (D2) metric, a point cloud based PSNR metric, a rendered image based PSNR metric, and a percep-tual based distortion metric.

At step 808, the electronic device 300 reconstructs at least a portion of a mesh-frame using the vertex positions of the at least one subdivided submesh. At step 810, the electronic device 300 creates a compressed bitstream including infor-mation on the submesh, the subdivision iteration count, the number of vertices associated with the submesh, and the distortion information. As described in this disclosure, in various embodiments, the electronic device 300 can signal the number of vertices associated with the submesh and the distortion information as signaling elements. In some embodiments, the signaling elements are signaled as part of an SEI message. The output bitstream can be transmitted to an external device or to a storage on the electronic device 300.

Although FIG. 8 illustrates one example of an encoding method 800 allowing for reconstruction of a simplified submesh, various changes may be made to FIG. 8. For example, while shown as a series of steps, various steps in FIG. 8 may overlap, occur in parallel, or occur any number of times. It will be understood that the method 800 can be used with any number of submeshes, and the submesh described with respect to the method 800 is merely for illustrative purposes.

FIG. 9 illustrates an example decoding method 900 for reconstruction of a simplified submesh in accordance with this disclosure. For ease of explanation, the method 900 of FIG. 9 is described as being performed using the electronic device 300 of FIG. 3. However, the method 900 may be used with any other suitable system and any other suitable electronic device.

As shown in FIG. 9, at step 902, the electronic device 300 receives a compressed bitstream including a base mesh sub-bitstream. At step 904, the electronic device 300 decodes a plurality of submeshes from the base mesh sub-bitstream. At step 906, the electronic device 300 subdivides a submesh of the plurality of submeshes according to a subdivision iteration count to generate at least one subdivided submesh. This includes, as shown at step 908, that the electronic device determines a number of vertex positions for the at least one subdivided submesh by use of a number of vertices associated with an original submesh and by use of distortion information between the original submesh and a base mesh at each subdivision iteration associated with the subdivision iteration count. In some embodiments, the number of vertices is determined based on a difference between a number of vertices associated with a next iteration of the subdivision iteration count and a current iteration of the subdivision iteration count.

In various embodiments, the number of vertices associated with the original submesh and the distortion information are included as signaling elements in association with the compressed bitstream. In some embodiments, the signaling elements also include one or more of the subdivision iteration count, a submesh identifier, and a number of distortions associated with the submesh. In some embodiments, the signaling elements are signaled as part of an SEI message. In various embodiments, the distortion information includes a distortion metric type. In various embodiments, the distortion metric type includes at least one of a point cloud based point-to-point (D1) metric, a point cloud based point-to-plane (D2) metric, a point cloud based PSNR metric, a rendered image based PSNR metric, and a perceptual based distortion metric.

At step 910, the electronic device 300 reconstructs at least a portion of a mesh-frame using the vertex positions corresponding to the at least one subdivided submesh. In some embodiments, the electronic device 300 halts the reconstruction of the mesh-frame at a particular iteration of the subdivision iteration count based on the distortion information indicating a reconstruction quality is above a threshold. At step 912, the electronic device 300 outputs the decoded content, such as 3D video including a reconstructed mesh-frame. The output decoded content can be transmitted to an external device or to a storage on the electronic device 300, for instance.

Although FIG. 9 illustrates one example of a decoding method 900 for reconstruction of a simplified submesh, various changes may be made to FIG. 9. For example, while shown as a series of steps, various steps in FIG. 9 may overlap, occur in parallel, or occur any number of times. It will be understood that the method 900 can be used with any number of submeshes, and the submesh described with respect to the method 900 is merely for illustrative purposes.

Figure 10A:
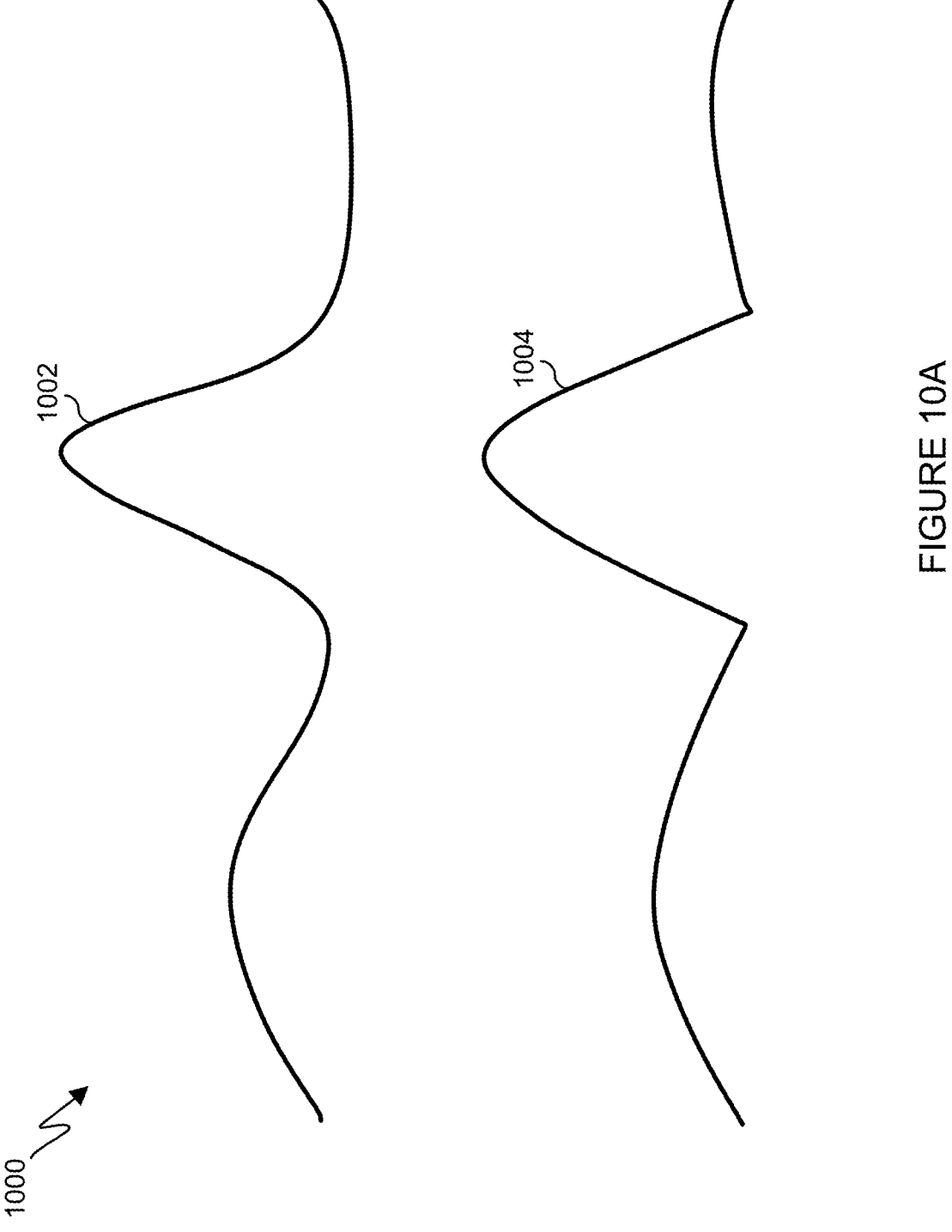
FIGS. 10A and 10B illustrate an example process for creating decimated meshes corresponding to original meshes in accordance with this disclosure.
Figure 10B:
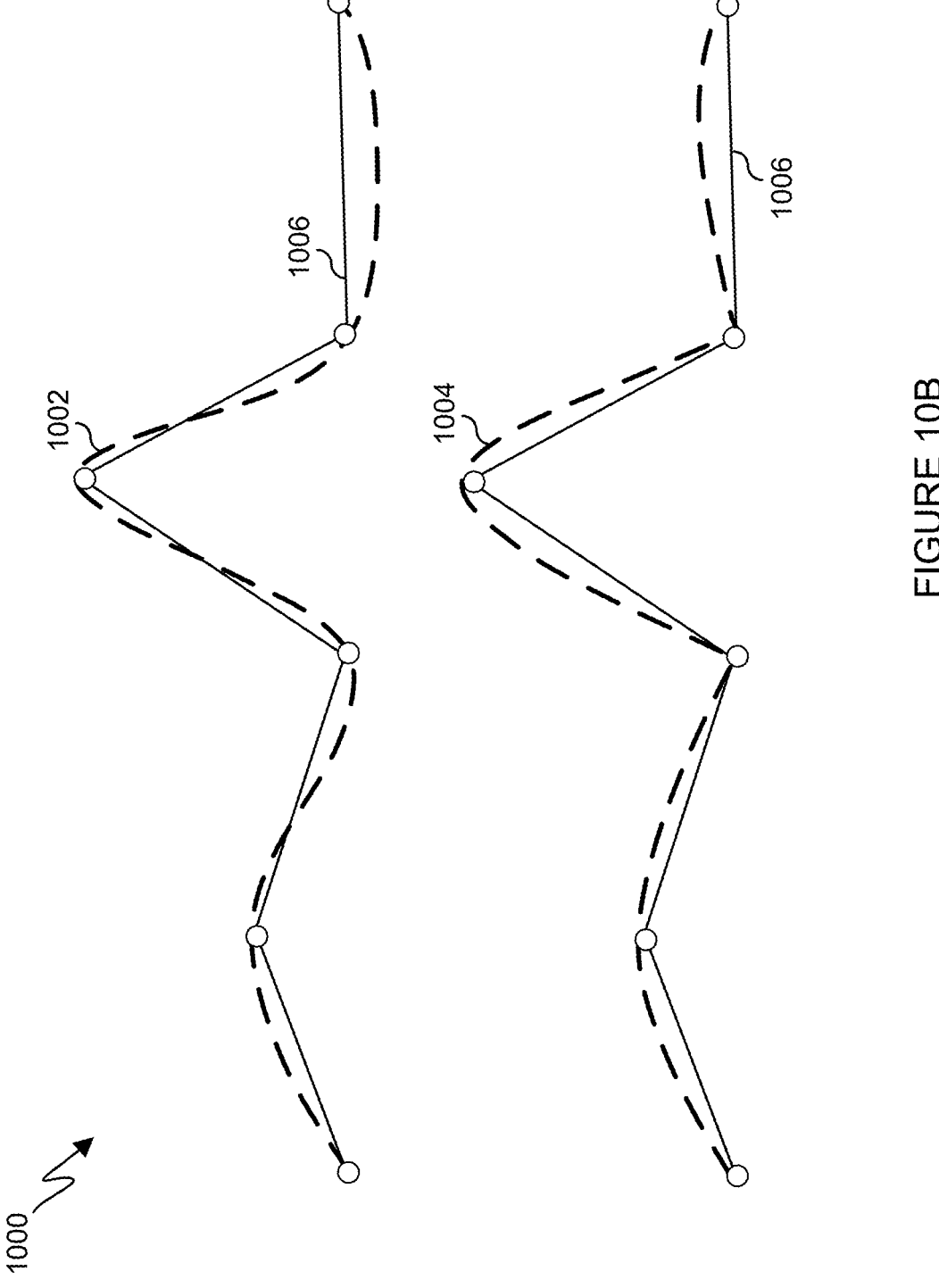

FIGS. 10A and 10B illustrate an example process 1000 for creating decimated meshes corresponding to original meshes in accordance with this disclosure. The process 1000 illustrated in FIG. 10 is for illustration only. FIG. 10 does not limit the scope of this disclosure to any particular implementation of a process for creating decimated meshes corresponding to original meshes. For ease of explanation, the process 1000 of FIG. 10 may be described as being performed using the electronic device 300 of FIG. 3. However, the process 1000 may be used with any other suitable system and any other suitable electronic device.

As noted herein with respect to FIG. 6, since an original mesh is decimated into a simplified version, i.e., the base mesh, in some cases the base mesh created for two different original meshes could be the same even though the two original meshes are different. This can lead to instances where there might be more than one identical base mesh that is generated, stored, and used, causing a waste of resources. This disclosure thus provides for eliminating duplicate base meshes to further improve compression efficiency.

For instance, FIG. 10A shows two different original meshes, a first original mesh 1002 and a second original mesh 1004. As shown in FIG. 10A, the shape of the curves of the first original mesh 1002 and the second original mesh 1004 are different. As shown in FIG. 10B, however, a decimated mesh 1006 created using the first original mesh 1002 and the second original mesh 1004 is the same, even though the first original mesh 1002 and the second original mesh 1004 are different. Thus, the base mesh (the decimated mesh 1006) used for both of the two meshes will be identical during encoding/decoding of the compressed bitstream, causing redundant data to be transmitted and processed.

However, this disclosure provides that, to avoid this redundancy and efficiency, just one decimated mesh 1006 could be used to calculate the displacement fields for the two different original meshes 1002, 1004, and just one decimated mesh 1006 could be used by the decoder when generated the reconstructed mesh. It will be understood that it is even possible that more than two original meshes have the same base mesh, and thus a single base mesh could even be used for three or more original submeshes.

There might be the cases that simplified mesh is a transformed version of simplified mesh of another mesh. Therefore, various embodiments of this disclosure, include transforming one base mesh to use it as a base mesh to calculate displacement fields for another mesh.

Although FIG. 10 illustrates one example process 1000 for creating decimated meshes corresponding to original meshes, various changes may be made to FIG. 10. The process 1000 may be used in any other suitable process and is not limited to the specific process described above. Also, it will be understood that the decimated meshes and original meshes shown are for illustrative purposes, and decimated meshes and original meshes can appear differently from the decimated meshes and original meshes shown in FIG. 10.

FIG. 11 illustrates an example encoding method 1100 for creating and signaling duplicated base mesh information in accordance with this disclosure. For ease of explanation, the method 1100 of FIG. 11 is described as being performed using the electronic device 300 of FIG. 3. However, the method 1100 may be used with any other suitable system and any other suitable electronic device.

As shown in FIG. 11, at step 1102, the electronic device 300 identifies that a first decimated mesh for a first original submesh is identical to a second decimated mesh for a second original submesh, such as described with respect to FIGS. 10A and 10B. At step 1104, the electronic device 300 selects the first decimated mesh for use in reconstructing the second submesh. At step 1106, the electronic device 300 constructs signaling elements to instruct a decoder to copy the first decimated mesh in reconstructing the second submesh and to instruct the decoder on how to manipulate the copied first decimated mesh. For example, in various embodiments, identifying the base mesh to be copied and operations to be applied to the mesh to be used as a base mesh for reconstructing another mesh can be signaled with the below syntax by the encoder electronic device 300:

```
submesh_identifier
translation_flag
rotation_flag
flipping_flag
if(translation_flag == true){
    translation_offset_u
    translation_offset_v
    translation_offset_w
}
if(rotation_flag == true){
    anchor_point_u
    anchor_point_v
    anchor_point_w
    rotation_yaw
    rotation_pitch
    rotation_roll
}
if(flipping_flag == true){
    flipping_surface_center_u
    flipping_surface_center_v
    flipping_surface_center_w
    flipping_surface_normal_u
    flipping_surface_normal_v
    flipping_surface_normal_w
}
```

As shown above, the syntax can include "submesh_identifier" that indicates the submesh whose base mesh will be copied to create a base mesh for the current submesh. The syntax can also include "translation_flag," "rotation_flag," and/or "flipping_flag," which indicate whether translation, rotation, and flipping, respectively, will be applied to the copied base mesh for the number of subdivision iteration to be applied to generate the base mesh for the current submesh. The syntax can also include "translation_offset_u," "translation_offset_v," and/or "translation_offset_w," which indicate the amount of translation in the u, v, and w axis, respectively, to be applied to the copied base mesh to generate the base mesh for the current submesh. The syntax can also include "anchor_point_u," "anchor_point_v," and/or "anchor_point_w," which indicate the location of a point in a 3D space to be used as an anchor point of rotations. The syntax can also include "rotation_yaw," "rotation_pitch," and/or "rotation_roll," which indicate the amount of rotation in yaw, pitch and roll axis, respectively, to be applied to the copied base mesh to generate the base mesh for the current submesh.

The syntax can also include "flipping_surface_center_u," "flipping_surface_center_v," and/or "flipping_surface_center_w," which indicate the center point of the surface for a flipping operation to be applied to the copied base mesh to generate the base mesh for the current submesh. The syntax can also include "flipping_surface_normal_u," "flipping_surface_normal_v," and/or "flipping_surface_normal_w," which indicate the normal vector of the surface used for a flipping operation applied to the copied base mesh to generate the base mesh for the current submesh.

It will be understood that the syntax shown is for illustrative purposes, and that other syntax can be used without departing from the scope of this disclosure. At step 1108, the electronic device 300 encodes and outputs a bitstream including the signaling elements. The output bitstream can be transmitted to an external device or to a storage on the electronic device 300.

Although FIG. 11 illustrates one example of an encoding method 1100 for creating and signaling duplicated base mesh information, various changes may be made to FIG. 11.

For example, while shown as a series of steps, various steps in FIG. 11 may overlap, occur in parallel, or occur any number of times.

FIG. 12 illustrates an example decoding method 1200 for using a copied base mesh during mesh reconstruction in accordance with this disclosure. For ease of explanation, the method 1200 of FIG. 12 is described as being performed using the electronic device 300 of FIG. 3. However, the method 1200 may be used with any other suitable system and any other suitable electronic device.

As shown in FIG. 12, at step 1202, the electronic device 300 receives a compressed bitstream including signaling elements identifying a first submesh whose decimated mesh is to be copied in reconstructing a second submesh. The signaling elements also identify how to manipulate the copied first decimated mesh. At step 1204, the electronic device 300 decodes at least a portion of the bitstream. At step 1206, the electronic device 300 identifies that a current submesh is the second submesh that should use a copy of the decimated mesh of the first submesh. For example, based on the signaling elements, in various embodiments, a certain base mesh can identified and a copy of it is moved to another location in 3D space to be used as a base mesh for reconstructing another mesh. In some embodiments, a certain base mesh is identified and copy of it is rotated against to a single point in 3D space or flipped against a certain surface defined in 3D space.

The electronic device 300 can process syntax elements of the signaling elements to create the copied base mesh, such as processing the syntax elements regarding the submesh identifier and translation, rotation, and/or flipping information described with respect to FIG. 11. At step 1208, the electronic device 300 copies the decimated mesh and manipulates the decimated mesh based on the signaling elements. At step 1210, the electronic device 300 outputs the decoded and reconstructed content.

Although FIG. 12 illustrates one example of a decoding method 1200 for using a copied base mesh during mesh reconstruction, various changes may be made to FIG. 12. For example, while shown as a series of steps, various steps in FIG. 12 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a communication interface configured to receive a compressed bitstream including a base mesh sub-bitstream; and
   a processor operably coupled to the communication interface, the processor configured to:
      decode a plurality of submeshes from the base mesh sub-bitstream;
      subdivide a submesh of the plurality of submeshes according to a subdivision iteration count to generate at least one subdivided submesh, including determine a number of vertex positions for the at least one subdivided submesh by use of a number of vertices associated with an original submesh and by use of distortion information between the original submesh and a base mesh at each subdivision iteration associated with the subdivision iteration count; and reconstruct at least a portion of a mesh-frame using the vertex positions corresponding to the at least one subdivided submesh.

2. The apparatus of claim 1, wherein the number of vertices associated with the original submesh and the distortion information are included as signaling elements in association with the compressed bitstream.

3. The apparatus of claim 2, wherein the signaling elements also include one or more of:

the subdivision iteration count;

a submesh identifier; and a number of distortions associated with the submesh.

4. The apparatus of claim 3, wherein the signaling elements are signaled as part of a Supplemental Enhancement Information (SEI) message.

5. The apparatus of claim 1, wherein the distortion information includes a distortion metric type.

6. The apparatus of claim 5, wherein the distortion metric type includes at least one of:

a point cloud based point-to-point (D1) metric;

a point cloud based point-to-plane (D2) metric;

a point cloud based peak signal-to-noise ratio (PSNR) metric;

a rendered image based PSNR metric; and a perceptual based distortion metric.

7. The apparatus of claim 1, wherein the processor is further configured to halt the reconstruction of the mesh-frame at a particular iteration of the subdivision iteration count based on the distortion information indicating a reconstruction quality is above a threshold.

8. The apparatus of claim 1, wherein the number of vertices is determined based on a difference between a number of vertices associated with a next iteration of the subdivision iteration count and a current iteration of the subdivision iteration count.

9. A method comprising:

receiving a compressed bitstream including a base mesh sub-bitstream;

decoding a plurality of submeshes from the base mesh sub-bitstream;

subdividing a submesh of the plurality of submeshes according to a subdivision iteration count to generate at least one subdivided submesh, including determining a number of vertex positions for the at least one subdivided submesh by using a number of vertices associated with an original submesh and by using distortion information between the original submesh and a base mesh at each subdivision iteration associated with the subdivision iteration count; and reconstructing at least a portion of a mesh-frame using the vertex positions corresponding to the at least one subdivided submesh.

10. The method of claim 9, wherein the number of vertices associated with the original submesh and the distortion information are included as signaling elements in association with the compressed bitstream.

11. The method of claim 10, wherein the signaling elements also include one or more of:

the subdivision iteration count;

a submesh identifier; and a number of distortions associated with the submesh.

12. The method of claim 11, wherein the signaling elements are signaled as part of a Supplemental Enhancement Information (SEI) message.

13. The method of claim 9, wherein the distortion information includes a distortion metric type.

14. The method of claim 13, wherein the distortion metric type includes at least one of:

a point cloud based point-to-point (D1) metric;

a point cloud based point-to-plane (D2) metric;

a point cloud based peak signal-to-noise ratio (PSNR) metric;

a rendered image based PSNR metric; and a perceptual based distortion metric.

15. The method of claim 9, further comprising halting the reconstruction of the mesh-frame at a particular iteration of the subdivision iteration count based on the distortion information indicating a reconstruction quality is above a threshold.

16. The method of claim 9, wherein the number of vertices is determined based on a difference between a number of vertices associated with a next iteration of the subdivision iteration count and a current iteration of the subdivision iteration count.

17. An apparatus comprising:

a communication interface; and a processor operably coupled to the communication interface, the processor configured to:

subdivide a submesh according to a subdivision iteration count to generate at least one subdivided submesh having vertex positions;

determine a number of vertices associated with the submesh to be used to simplify the vertex positions;

determine distortion information between the submesh and a base mesh at each subdivision iteration associated with the subdivision iteration count;

reconstruct at least a portion of a mesh-frame using the vertex positions of the at least one subdivided submesh; and create a compressed bitstream including information on the submesh, the subdivision iteration count, the number of vertices associated with the submesh, and the distortion information.

18. The apparatus of claim 17, wherein the processor is further configured to signal the number of vertices associated with the submesh and the distortion information as signaling elements.

19. The apparatus of claim 18, wherein the signaling elements are signaled as part of a Supplemental Enhancement Information (SEI) message.

20. The apparatus of claim 17, wherein the distortion information includes a distortion metric type including at least one of:

a point cloud based point-to-point (D1) metric;

a point cloud based point-to-plane (D2) metric;

a point cloud based peak signal-to-noise ratio (PSNR) metric;

a rendered image based PSNR metric; and a perceptual based distortion metric.

* * * * *